Sept. 10, 1968    H. N. WAGAR    3,401,336
APPARATUS FOR DETERMINING CURRENT DIRECTION IN RESPONSE TO
TWO SEPARATE FLUX INTERACTIONS
Filed July 22, 1964

INVENTOR
H. N. WAGAR
BY
ATTORNEY

United States Patent Office 3,401,336
Patented Sept. 10, 1968

3,401,336
APPARATUS FOR DETERMINING CURRENT DIRECTION IN RESPONSE TO TWO SEPARATE FLUX INTERACTIONS
Harold N. Wagar, Madison, N.J., assignor to Bell Telephone Laboratories, Incorporated, New York, N.Y., a corporation of New York
Filed July 22, 1964, Ser. No. 384,468
8 Claims. (Cl. 324—133)

ABSTRACT OF THE DISCLOSURE

Apparatus for detecting the direction of an unknown current is disclosed which includes two electrically and magnetically conducting members, a solid magnetic sleeve surrounding one portion of the two members, a coil surrounding another portion of the two members, a coil surrounding the sleeve means for inducing a common magnetic field in said members and said sleeve and means for indicating operation of the two coils. The currents passing through the members create an annular magnetic field within each member and a resultant annular magnetic field within the sleeve. The coils surrounding the sleeve and the two members indicate the reaction of the common field with the annular fields and monitoring these reactions will indicate the direction of the unknown current.

---

Figure 1:
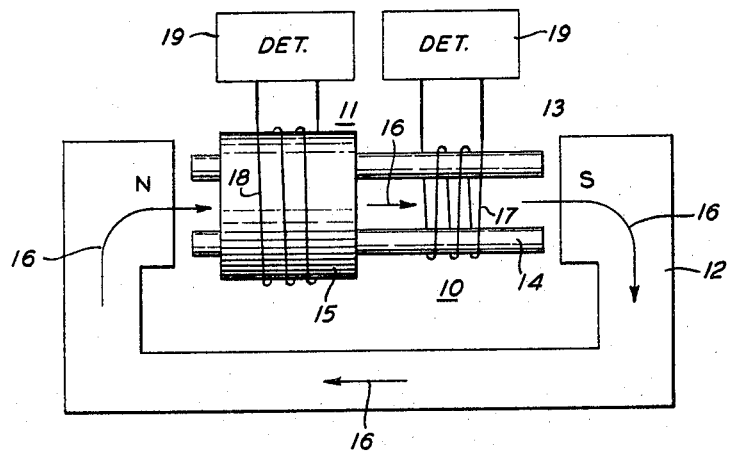

This invention generally relates to electromagnetic devices and particularly relates to electromagnetic devices for determining the direction of current flow.

Many times it is desirable to determine the direction of current flow in a conductor. For example, in certain voltage regulators, current flows in and out thereof in accordance with the load placed on a battery. Moreover, in certain motors, direction of rotation depends on the direction of the current flow therein.

Heretofore, current direction has been determined by using instruments having movable detecting elements. Moving parts, however, are susceptible to damage and must be carefully handled. Accordingly, it is advantageous to eliminate moving parts in such devices.

It is therefore an object of this invention to detect the direction of current flow in a conductor.

Another object of this invention is to detect the direction of current flow without using moving elements.

Still another object of this invention is to determine the presence of current in a conductor.

Still another object of this invention is to measure current in a conductor.

These and other objects are achieved in one illustrative embodiment of this invention wherein the electromagnetic device comprises a conductor assembly divided into two sections and including two members wherein each member is arranged to axially conduct a common flux and annularly conduct a current flux, a sleeve assembly arranged to axially conduct the common flux and to annularly conduct the resultant of the current fluxes annularly conducted by one section of the conductor assembly, and a detector for responding separately to interactions between common flux and the resultant current flux in the sleeve assembly and to interact between common flux and the resultant current flux in the other section of the conductor assembly.

One feature of this invention is a pair of members disposed in the path of a common magnetic flux wherein each of the members is suitable for conducting magnetic flux interactable with the common magnetic flux.

Another feature of this invention is a magnetic sleeve surrounding a conducting assembly and disposed in a magnetic flux common to both sleeve and conductor assembly. The sleeve assembly is arranged to conduct the resultant of two magnetic fluxes conducted by the conductor assembly and the resultant flux is interactable with the common magnetic flux.

Figure 2:
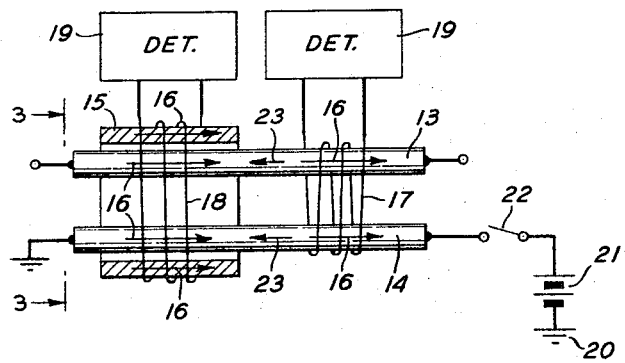
Figure 3:
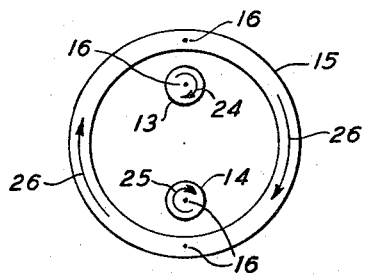

These and other objects and features of this invention will be readily understood from the following detailed description when taken in conjunction with the drawing in which:

FIG. 1 is an elevation view of the invention;
FIG. 2 is a cut-away view of a portion of the embodiment shown in FIG. 1 to which an electrical circuit has been attached; and
FIG. 3 is an end view of the embodiment shown in FIG. 2.

FIG. 1 shows a conductor assembly 10, a sleeve assembly 11, and a magnetic flux source 12. As illustrated the source 12 may conveniently be a permanent magnet. The sleeve assembly 11 is disposed around a forward section of the conductor assembly 10 and both are spaced between the magnetic poles of the source 12.

The conductor assembly 10, as shown in FIG. 2, comprises a pair of coextensive rods or wires 13 and 14. Each of the wire 13 and 14 is an electrical conductor made from any convenient magnetic material.

The sleeve assembly 11 comprises a sleeve 15. The sleeve 15 is advantageously cylindrical and is made from any convenient magnetic material.

The conductor assembly 10 and the sleeve assembly 11 are disposed in the path of a common magnetic flux emanating from the source 12. The common magnetic flux is symbolically represented by the arrows 16. As shown in FIG. 2, the flux 16 passes through the members or wires 13 and 14 and the sleeve 15. In FIG. 3, the flux 16 leaving the wires 13 and 14 and the sleeve 15 is represented by four dots.

As shown in FIG. 1, a coil 17 is wound around a rearward section of the conductor assembly 10. Moreover, a coil 18 is wound around the sleeve assembly 11. Both coils 17 and 18 are components of a detector. A detector comprises a coil terminated on any convenient current or voltage responsive device such as a gas tube. Each box 19 in FIGS. 1 and 2 represents such a device.

FIG. 2 shows the wires 13 and 14 as elements in two electrical circuits. The first or standard circuit comprises the rod 14, a ground 20 connected to one end thereof, and a battery 21 connected to the other end thereof through a switch 22. The second circuit comprises the rod 13 and a source of unknown current (not shown).

In operation, an unknown current is allowed to flow in the rod 13. Thereafter, the switch 22 is closed to cause a current to flow in the rod 14. In FIG. 2, the currents are shown flowing through the rods 13 and 14 in the same direction. Both currents are symbolically represented by the arrows 23.

An annular magnetic flux is associated with each flowing current. As shown in FIG. 3, the currents 23 establish annular fluxes in the wires 13 and 14 and the sleeve 15. The fluxes are symbolically represented by the arrows 24 and 25. When the fluxes 24 and 25 act in the same direction, as shown, they are additive. The resultant of the fluxes 24 and 25 is represented in the sleeve 15 by the arrow 26 as shown in FIG. 3.

It is known that an annular magnetic flux and an axial magnetic flux interact when they coexist in the same member. Moreover, it is known that the interaction of the two fluxes results in a reduction in the axial magnetic flux. Furthermore, the reduction in axial magnetic flux occurs without regard to the direction of the annular magnetic flux.

Therefore, when this invention is operated, the flux 16 common to the wires 13 and 14 interacts with the annular fluxes 24 and 25, respectively. As a result, a reduction of the axial flux in each of the wires 13 and 14 occurs.

Accordingly, a momentary output from the conductor assembly 10 is induced in the coil 17 by the changing axial flux 16.

Similarly, when the common flux 16 interacts with the resultant annular flux 26, a reduction occurs in the portion of the flux 16 conducted by the sleeve 15. Accordingly, a momentary output from the sleeve assembly 11 is induced in the coil 18.

From the foregoing, therefore, it is clear that an instantaneous output appears across the terminals of both coils 17 and 18 when current flows in the same direction in the wires 13 and 14. A different result occurs, however, when the currents are of equal magnitude and flow through the wires 13 and 14 in opposite directions. In such a case, only the coil 17 produces an output.

An output can be detected only when a change in axial flux occurs. Further, a change in axial flux occurs when axial and annular magnetic fluxes interact. Moreover, as previously stated, the change or reduction in axial flux occurs without regard to the direction of current in the wires 13 and 14. Thus, the coil 17 reacts to the presence of current in the wires 13 and 14 without regard to the direction thereof.

In the sleeve 15, however, no flux reduction occurs when currents of equal magnitude are flowing through the wires 13 and 14 in opposite directions. When the current in the wires 13 and 14 are oppositely directed, the annular fluxes 24 and 25 will also be oppositely directed. Accordingly, the fluxes 24 and 25 oppose each other in the sleeve 15. Therefore, since the magnitudes of the currents and the fluxes therefrom are equal, there is no resultant annular flux. Since there is no resultant annular flux to interact with the axial flux 16, no reduction in the flux 16 occurs. As a result, the coil 18 does not respond when currents having equal magnitudes flow in opposite directions through the conductor assembly 10.

The proper utilization of the characteristics of the conductor assembly 10 and the sleeve assembly 11 readily determines current direction. Responses in both coils 17 and 18 indicate the currents in the rods 13 and 14 are flowing in the same direction. Moreover, since the direction of current in the rod 14 is known, the direction of current in the rod 13 is readily determined by comparison. Similarly, a response from the coil 17 alone indicates the currents are oppositely directed.

The current or voltage responsive devices attached to the coils 17 and 18 can be used merely to indicate the direction of current flow as hereinbefore described. However, when such devices are responsive to the magnitude of flux changes as well, then the magnitude of the currents in the wires 13 and 14 can also be measured. For example, a plurality of parallel gas tubes can be connected in parallel across each coil. Each gas tube can be arranged to conduct when a predetermined potential is applied thereto. As a result, every gas tube having a breakdown potential below the magnitude of the voltage induced in the coils 17 and 18 conducts in response to flux reductions occurring in the conductor assembly 10 and sleeve assembly 11, respectively.

The foregoing description has been restricted to the case wherein currents of equal magnitude flow in the rods or wires 13 and 14. Where the current magnitudes are different, however, annular flux from the larger current will produce a net resultant in the sleeve assembly 11. As a result, both the coil 17 and the coil 18 will respond when the currents flowing in the wires 13 and 14 are oppositely directed.

Current direction, however, is readily determined by making two readings of the currents. In the first, current from the standard or battery 21 flows through the rod 14 in one direction. In the second, current from the standard or battery 21 is compelled to flow through the rod 14 in the opposite direction. In both tests, the current from the unknown flows in the same direction. In analyzing the results, a low-level response by the coil 18 indicates current in opposite directions, while a high-level response indicates current in the same direction.

The foregoing has disclosed an electromagnetic device suitable for detecting current direction without requiring any movable parts. While only one embodiment has been described, it represents the principles of the invention and is not a limitation thereon. Accordingly, it is recognized that persons skilled in the art will readily be able to assemble other embodiments which are not shown, but fall within the scope of the concept underlying this invention.

What is claimed is:

1. An electromagnetic device comprising:
    conductor means for carrying electrical currents, said conductor means being divided into forward and rearward sections and including a pair of elongated members made of an electrically conducting material and disposed substantially in parallel with each other;
    a source of first magnetic flux, one of said two members combining said first magnetic flux and a second magnetic flux, wherein said second flux interacts with said first flux within said one member, has a major component acting in annular relationship to a major component of said first flux and has a magnitude proportional to the magnitude of current flowing in said one member;
    the other of said two members combining said first magnetic flux and a third magnetic flux wherein said third flux interacts with said first flux within said other member, has a major component acting in annular relationship to a major component of said first flux and has a magnitude proportional to the magnitude of current flowing in said other member;
    sleeve means for combining said first magnetic flux and resultant magnetic fluxes emanating from said two members, said sleeve means being a solid magnetically conducting member disposed in an annular relationship around said forward section of said conductor means; and
    detecting means for separately indicating the nature of flux interactions occurring in said sleeve means and in the rearward section of said conductor means whereby conclusions can readily be deduced concerning current direction in said members.

2. An electromagnetic device in accordance with claim 1 wherein said pair of elongated members comprises a pair of magnetic wires.

3. An electromagnetic device in accordance with claim 1 wherein said sleeve means comprises a solid magnetic tube disposed around said conductor means.

4. An electromagnetic device in accordance with claim 1 wherein said detecting means includes a pair of coils, one wound on said sleeve means and the other wound on said rearward section of said conductor means.

5. An electromagnetic device in accordance with claim 1 wherein said members comprise a pair of magnetic wires, said sleeve means comprises a solid, tubular, magnetic sleeve encircling one portion of said wires and said detecting means includes a coil wound around another portion of said wires and a coil wound around said sleeve.

6. An electromagnetic device comprising:
    a conductor assembly divided into two sections and including two elongated electrically conducting magnetic members disposed substantially in parallel with each other and extending from one end of said conductor assembly to the other;
    a source of magnetic first flux having a magnetic pole adjacent to one of said conductor assembly ends and the other pole adjacent to the other conductor assembly end in an arrangement wherein first flux emanating from one pole of said source passes axially through said two members before returning to said other pole;
    an electrical circuit connected to one of said two members for establishing an annular magnetic second flux within said one member in response to the flow of current;

an electrical circuit connected to the other of said two members for establishing an annular magnetic third flux within said other member in response to the flow of current;

a solid magnetic sleeve annularly disposed around one section of said conductor assembly and including a coil for generating signals in response to interactions occurring in said sleeve between said first flux and the resultant of said second and third fluxes emanating from said two members;

a coil for generating signals in response to interactions between said first flux and said second and third fluxes occurring in the other section of said conductor assembly; and means responsive to said coils for separately indicating the nature of flux interactions occurring in said sleeve and said conductor assembly.

7. The combination in accordance with claim 6 wherein said two members are wires.

8. The combination in accordance with claim 6 wherein said sleeve is a cylinder having solid walls.

References Cited

UNITED STATES PATENTS

| | | | |
|---|---|---|---|
| 1,749,366 | 3/1930 | Zubaty | 324—146 |
| 1,825,905 | 10/1931 | Imhof | 336—177 |
| 2,916,696 | 12/1959 | Schonstedt | 324—43 |
| 3,319,161 | 5/1967 | Beynon | 324—47 |

RUDOLPH V. ROLINEC, *Primary Examiner.*

R. J. CORCORAN, *Assistant Examiner.*